United States Patent [19]
Chasseguet et al.

[11] Patent Number: 4,747,801
[45] Date of Patent: May 31, 1988

[54] DAMPER-TYPE FLYWHEEL SUITABLE FOR AUTOMOBILE TRANSMISSIONS

[75] Inventors: Gustave Chasseguet, Taverny; Jacques Paquin, Villeneuve-la-Garenne, both of France

[73] Assignee: Valeo, Paris, France

[21] Appl. No.: 6,167

[22] Filed: Jan. 22, 1987

[30] Foreign Application Priority Data

Jan. 22, 1986 [FR] France ................. 86 00854

[51] Int. Cl.$^4$ .................... F16D 3/14; F16F 15/12
[52] U.S. Cl. ........................ 464/66; 74/574; 192/106.2
[58] Field of Search ............ 74/574; 192/106.2; 464/63, 64, 66, 67, 68

[56] References Cited

U.S. PATENT DOCUMENTS

| 4,440,283 | 4/1984 | Nioloux | 464/68 X |
| 4,548,311 | 10/1985 | Lech | 192/106.2 |
| 4,663,983 | 5/1987 | Kobayashi et al. | 464/68 X |

FOREIGN PATENT DOCUMENTS

| 416355 | 10/1967 | Australia . | |
| 2931423 | 2/1980 | Fed. Rep. of Germany | 192/106.2 |
| 2268994 | 11/1975 | France . | |

Primary Examiner—Daniel P. Stodola
Attorney, Agent, or Firm—Charles E. Brown; Charles A. Brown

[57] ABSTRACT

A damper-type flywheel comprises a first part on which are two spaced annular flanges and a second part coaxial with the first part, the first and second parts being rotatable relative to each other. There is a flange assembly comprising at least one annular flange on the second part disposed between the annular flanges on the first part. A friction device is operative between the first and second parts for relatively small amounts of relative displacement between them. At least two circumferentially acting spring members are operative between the first and second parts in conjunction with this friction device for relatively large amounts of relative displacement between them. Openings in the annular flanges of the first part accommodate these spring members. Arms on the flange assembly of the second part cooperate with the spring members. A spring centering device is provided between the first and second parts so that, in an inoperative configuration of the flywheel, there is clearance in each circumferential direction between the spring members and the arms. At least one circumferential spacer is disposed circumferentially between two of the spring members and bears circumferentially on these two spring members. The spring centering device is operative between the flange assembly and the spacer.

14 Claims, 3 Drawing Sheets

DAMPER-TYPE FLYWHEEL SUITABLE FOR AUTOMOBILE TRANSMISSIONS

BACKGROUND OF THE INVENTION

1. Field of the invention

The present invention concerns flywheels for transmission systems, of the kind usually constituting an inertial member in clutches, especially clutches designed to be fitted to automobile vehicles.

It is more particularly directed to flywheels, known as damper-type flywheels, incorporating damper means operative against possible torsional torques.

2. Description of the prior art

It is usual to incorporate a torsional damper device in a transmission system to filter out vibration that can arise anywhere in the kinematic system that the transmission constitutes, extending from the motor to the wheel axles in the case of an automobile vehicle.

The torsional damper device is usually incorporated in the friction disk of the clutch.

However, it has also been proposed to incorporate a torsional damper device in the flywheel, either instead of or in conjunction with the damper device in the friction disk, for certain applications of a specific kind, in particular for vehicles where the motor develops a relatively high torque at low rotation speeds, where there may be a particular requirement to eliminate "trash" noise which occurs under load.

This is the case, for example, with the damper-type flywheel that is the subject matter of German Pat. No. 29 31 423.

Generally speaking, a damper-type flywheel of this kind comprises two coaxial parts disposed to rotate relative to each other, namely a first part comprising two spaced annular flanges and a second part comprising at least one annular flange, there being two in practice, disposed between the flanges on the first part, together with spring means operative between the first and second parts and comprising circumferentially acting spring members individually accommodated in openings provided for them in the flanges of the first part and with which cooperate arms forming part of the flange or flanges of the second part.

In the embodiments proposed there is circumferential clearance, in the inoperative configuration of the flywheel, between the circumferentially acting spring members and the arms on the flange or flanges of the second part that have to interfere with them, so that these circumferentially acting spring members are not operative for lower values of relative angular displacement between the two parts but only for higher values of such displacement, only friction means provided axially between said parts being operative for said lower values of relative angular displacement.

This arrangement has advantages, in particular that of simplicity.

However, it also has the disadvantage of entailing, in the inoperative configuration of the flywheel, uncertainty as to the angular position of the flange or flanges of the second part relative to the flanges of the first part, this angular position merely corresponding to that at the time the torque to be transmitted from one of said parts to the other drops below the friction torque between them at this time.

Because of this uncertainty as to the position of the flange or flanges of the second part, the circumferential clearance provided between the arms of this flange or flanges and the circumferentially acting spring members with which these arms have to interfere is distributed in an uncontroled manner, and thus almost inevitably in an irregular manner, between the two circumferential directions, with the possibility of there remaining no clearance for one circumferential direction, to the detriment of the overall functioning.

Also, given these conditions the arms of the flange or flanges of the second part come into circumferential contact with the circumferentially acting spring members with which they have to interfere or with members disposed between them and the latter with some violence, inevitably generating noise.

To alleviate these disadvantages consideration might be given to providing between the two parts of a damper-type flywheel of this kind spring centering means so that, for the inoperative configuration of the flywheel, there is circumferential clearance in both circumferential directions between the circumferentially acting spring members operative circumferentially between said parts and the arms of the flange or flanges of the second of said parts designed to interfere with the latter.

However, the problem is then to provide a simple means of fitting these spring centering members without this having any other consequences with regard to overall functioning, and even though the space into which they have to be fitted is already particularly congested.

A general objective of the present invention is a device providing a satisfactory solution to this two-fold requirement.

SUMMARY OF THE INVENTION

The present invention consists in a damper-type flywheel comprising a first part, two spaced annular flanges on said first part, a second part coaxial with said first part, said first and second parts being rotatable relative to each other, at least one annular flange on said second part disposed between said annular flanges on said first part, friction means operative between said first and second parts for relatively small amounts of relative displacement between them, at least two circumferentially acting spring members operative between said first and second parts in conjunction with said friction means for relatively large amounts of relative displacement between them, openings in said annular flanges of said first part accommodating said spring members, arms on said at least one flange of said second part cooperating with said spring members, spring centering means between said first and second parts whereby, in an inoperative configuration of the flywheel, there is clearance in each circumferential direction between said spring members and said arms, and at least one circumferential spacer disposed circumferentially between two of said spring members and bearing circumferentially on said two spring members, said spring centering means being operative between said at least one flange and said spacer.

For example, if the spring centering means comprise a number of spring centering members individually accommodated in openings provided for them in the flange or flanges of the second part, the circumferential spacers employed in accordance with the invention to promote the intervention of such spring centering means, of which there is one for each spring member, each consists of a plate comprising an opening for the corresponding spring centering member.

Alternatively, if the spring centering members are helical coil springs, that is to say springs comprising helically would wire, each consists of two fingers extending from respective circumferential ends of each spring centering member and in one piece with the latter, said fingers each being formed by an appropriately shaped extension of the wire forming the centering member.

Be this as it may, when the second part comprises two axially spaced annular flanges, each circumferential spacer preferably extends axially between the two flanges.

Thus advantage is drawn from the space already existing between them, with no significant increase in the overall axial size of the assembly, and possibly no such increase at all.

The characteristics and advantages of the invention will emerge from the following description given by way of example with reference to the appended schematic drawings.

DESCRIPTION OF THE PREFERRED EMBODIMENTS

As shown in the figures, the damper-type flywheel in accordance with the invention generally comprises two coaxial parts A and B rotatable relative to each other.

Figure 2:
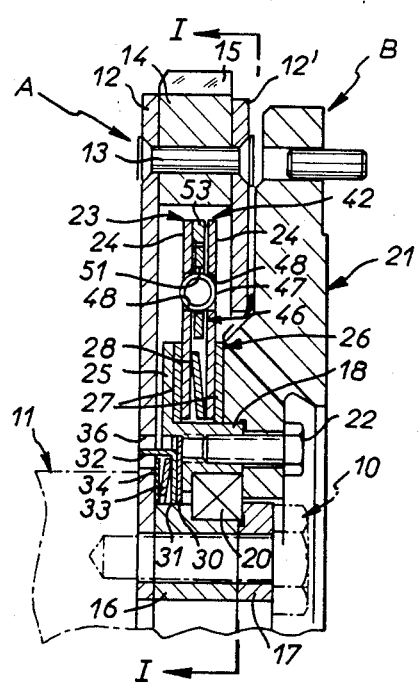
FIG. 2 is a partial view of the damper-type flywheel in axial cross-section on the line II—II in FIG. 1.

The part A, or input part, is designed to be attached by screws 10, schematically represented in chain-dotted outline in FIG. 2, to a shaft 11, which is a driving shaft such as, for example, the output shaft or crankshaft of the motor in the case of an automobile vehicle.

This part A comprises two spaced annular flanges 12 and 12'.

The outside or largest diameter edges of the flanges 12, 12' have substantially the same radius and the flanges are fastened together by means of rivets 13 with an annular spacer 14 inserted between them.

This annular spacer 14 has teeth 15 at its outside edge and thus of itself constitutes a starter ring for the flywheel.

The inside or smallest diameter edges of the flanges 12 and 12' have different radii, however; the flange 12 extends substantially to the immediate vicinity of the axis of the flywheel, whereas the flange 12' stops short of the latter by a considerable distance.

Overlying the inside edge of the flange 12, on the same side of it as the flange 12', are two annular ring members 16 and 17 through which the screws 10 pass, these screws also passing through the flange 12 so that the two ring members 16 and 17 are fastened to the flange 12 by the screws 10.

Figure 1:
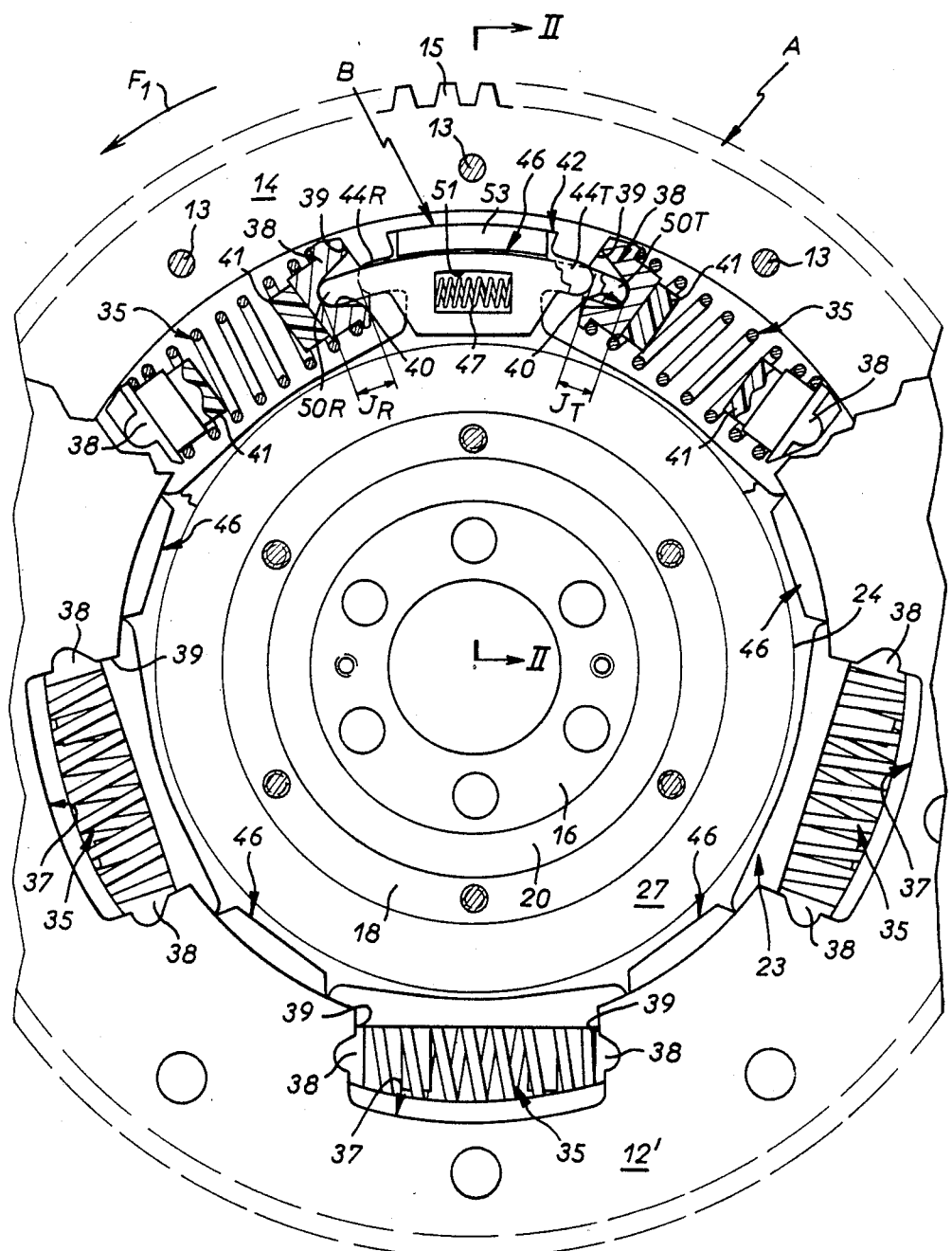
FIG. 1 is locally cutaway partial view in elevation and cross-section of a damper-type flywheel in accordance with the invention, with reference to the cross-section plane I—I in FIG. 2.

As can be seen in FIG. 1, threaded holes may nevertheless be provided specifically for fixing the ring members 16, 17 to the flange 12, independently of the fixing of the flywheel to the shaft 11 concerned.

The part B, or the output part, generally comprises a hub 18 which surrounds the ring member 16 of the part A, there being disposed between it and the latter a bearing 20 keyed axially between the ring member 16 and the ring member 17 which overlies it, and a flange 21 attached to said hub 18 by screws 22 and so constrained to rotate with it.

For the most part the flange 21 lies outside the volume defined by the flanges 12 and 12' of part A and through this flange the damper-type flywheel in accordance with the invention is adapted to serve as a reaction plate for a friction disk (not shown) and so to be frictionally constrained to rotate with the friction disk, while the hub of the friction disk is constrained to rotate with a second shaft which is a driven shaft such as, for example, the input shaft of a gearbox in the case of an automobile vehicle.

Part B further comprises an annular flange assembly 23 formed by at lesat one flange 24 between the flanges 12 and 12' of part A.

The flange assembly 23 extends around the hub 18 between the flange 21 and a flange 25 projecting radially from said hub 18 at the end opposite the flange 21; it is formed by two annular flanges 24 axially spaced from each other and it is operative within part B through the intermediary of a torque limiter 26.

The torque limiter 26 utilizes two friction ring members 27 lyng one on each side of the flange assembly 23, one of them being disposed between the flange assembly 23 and the flange 21 and the other between the flange assembly 23 and the radial flange 25 on the hub 18, and an axially acting spring washer 28, for example a simple Belleville spring washer as shown here, disposed axially between the two flanges 24 constituting the flange assembly 23 and adapted conjointly to secure axial clamping of said friction ring members 27, one of them between said flange 25 and one of said flanges 24 and the other between the other of said flanges 24 and said flange 21.

Ignoring the resulting torque limiter 26, the flange assembly 23 of part B is free to rotate about the hub 18 thereof.

Friction means are operative between parts A and B of the damper-type flywheel in accordance with the invention for relatively small values of relative angular displacement between the parts A and B and spring means are operative between the parts A and B for relatively high values of such relative angular displacement, as will be described in more detail hereinafter.

These friction means comprise a friction ring member 30 in contact with the hub 18 of part B, on the side of the latter facing towards the flange 12 of part A, and carried by a support ring 31 keyed by axial lugs 32 to said flange 12, the axial lugs 32 being inserted without any circumferential clearance into openings 36 provided for this purpose in the flange 12; the member 30 is urged axially against said hub 18 by an axially acting spring washer 33, such as a Belleville washer, operative between said support ring 32 and a distributor ring 34 overlying said flange 12.

The clamping force developed by the spring washer 33 is significantly less than that developed by the spring washer 28.

The spring means operative between parts A and B comprise five circumferentially acting spring members 35 which are individually accommodated in openings 37 formed for them in the flanges 12 and 12' of part A.

The circumferentially acting spring members 35 are helical coil springs extending substantially tangentially to a common circumference of the flywheel; at their circumferential ends they bear on plug or cup members 38 disposed circumferentially between them and the radial edges 39 of the openings 37 in which they are accommodated and which, on the side facing said radial edges 39, feature a respective concave dished surface 40 facing towards the radial edge 39.

On the side opposite the radial edges 39 of the openings 37 the plug members 38 each carry a circumferentially projecting elastic material buffer 41.

In the inoperative configuration of the flywheel the plug members 38 are in contact with the radial edges 39 of the openings 37, because of the action of the circumferentially acting spring members which extend between them, and these spring members are optionally pre-stressed at this time.

Arms 42 forming part of the flange assembly 23 of part B are adapted to interfere with the circumferentially acting spring members 35, each arm 42 extending radially between two successive circumferentially acting spring members 35.

There are five such arms 42 because there are five circumferentially acting spring members 35.

Each of the arms 42 that the flange assembly 23 thus features is, of course, formed by two arms in corresponding relationship to each other, one on each of the two flanges 24 constituting the flange assembly 23.

As the flanges 24 operate conjointly and in unison with each other, they will be regarded here as constituting one and the same unit, namely the flange assembly 23.

Each arm 42 of the flange assembly 23 has two fingers 44T, 44R extending in respective opposite circumferential directions, the finger 44T extending the circumferential direction corresponding to so-called "upshift" functioning for which the rotational torque transmitted by the damper-type flywheel is increasing, whereas the finger 44R extends in the opposite circumferential direction, corresponding to so-called "downshift" functioning, for which said torque is decreasing.

In the inoperative configuration of the flywheel the fingers 44T, 44R that each of the arms 42 of the flange assembly 23 of the part B thus features are both circumferentially spaced from the bottom of the dished surface 40 of the plug members 38 of the circumferentially acting spring members 35 between which an arm 42 of this kind extends, possibly being partially inserted into the dished surface 40.

In other words, in the inoperative configuration of the flywheel there is circumferential clearance between said arms 42 and said plug members 38.

Spring centering means are provided between parts A and B so that, in the inoperative configuration of the flywheel, there is such circumferential clearance in both circumferential directions; in other words, there is sure to effective circumferential clearance in one circumferential direction JT and in the opposite circumferential direction JR between the circumferentially acting spring members 35 and the arms 42 of the flange assembly 23 of part B, said spring centering means being operative between the flange assembly 23, on the one hand, and at least one circumferential spacer 46, on the other hand, disposed circumferentially between said circumferentially acting spring members 35, in practice between two consecutive circumferentially acting spring members 35, bearing on the latter in the circumferential direction.

The spring centering means employed are operative between at least one arm 42 of the flange assembly 23 and at least one circumferentially spacer 46.

They comprise five spring centering members 47 and are operative between the arms 42 of the flange assembly 23 and an equal number of circumferential spacers 46, of which there is one for every spring centering member 47 in line with the arms 42 of the flange assembly 23, and thus alternate with the circumferentially acting spring members 35.

The spring centering members 47 are simple helical coil springs individually accommodated in housings 48 provided for them in the flanges 24 forming the flange assembly 23 of part B, to be more precise in the arms 42 of this flange assembly 23, extending substantially tangentially to a common circumference of the flywheel.

The housings 48 are formed by localized openings in said arms 42.

The spring centering members also extend along the same circumference of the flywheel as the circumferentially acting spring members 35.

For the most part, the spring centering members 47 are advantageously confined within the overall volume defined conjointly by the flanges 24 constituting the flange assembly 23, possibly projecting very slightly from this volume in the openings in the flanges 24 constituting their housings 48.

For proper adaptation of these openings to the contour of the spring centering members 47, and for correct functioning of the latter, at least one of the circumferential edges of said openings is preferably bevelled, as shown here.

In the inoperative configuration of the flywheel, the spring centering members 47 occupy their housings 48 without circumferential clearance, and may be pre-stressed in them.

The circumferential spacers 46 employed, of which there are five, like the spring centering members 47, each lie between two circumferentially acting spring members 35, being disposed axially between the two flanges 24 constituting the flange assembly 23 of part B.

Each has two fingers 50T, 50R which extend in respective opposite circumferential directions, the finger 50T extending in the circumferential direction corresponding so-called "upshift" functioning and the other finger 50R extending in the circumferential direction corresponding to so-called "downshift" functioning; in the inoperative configuration of the flywheel, each bears against the back of the respective dished surface 40 of the plug members 48 of the circumferentially acting spring members 45 between which they extend.

The circumferential spacers 46A each comprise a plate 46 featuring an opening 51 for the corresponding spring centering member 47.

In the embodiment specifically shown in FIGS. 1 through 3, the plates constituting the circumferential spacers 46 are independent of each other and in order to retain them in the radial direction the flange assembly 23 of part B, to be more precise at least one of the flanges 24 constituting the flange assembly 23, has axially projecting bars 53, one for each of the circumferential spacers 46.

These bars 53 extend along the larger diameter circumferential edge of the arms 42 of the flange assembly 23 in question, between the flanges 24 constituting the latter, being attached to one or other of the flanges 24 as by adhesive bonding, for example.

Figure 3A:
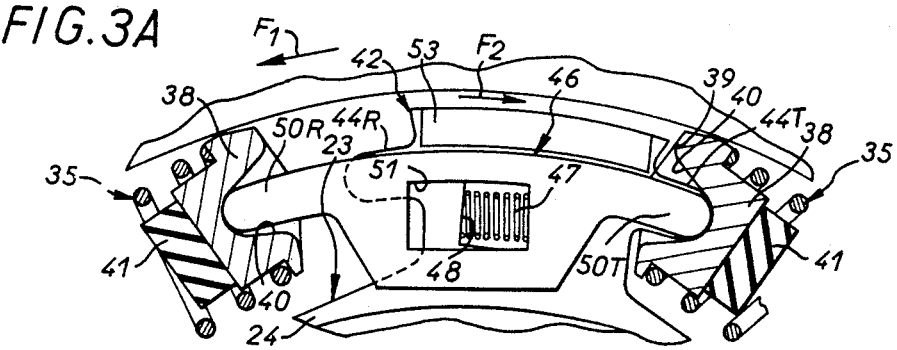
FIGS. 3A and 3B are partial views in elevation and cross-section each reproducing to a larger scale part of FIG. 1 and each illustrating a respective successive phase in the functioning of the damper-type flywheel in accordance with the invention.
Figure 3B:
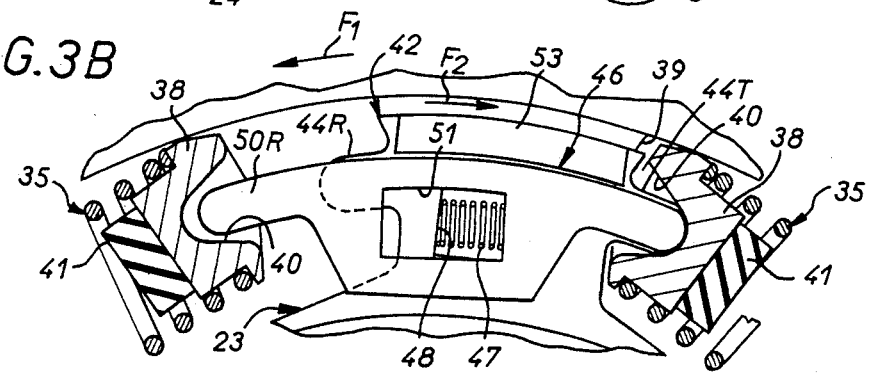

Assuming that in so-called "upshift" functioning the flywheel rotates about its axis in the circumferential direction shown by an arrow F1 in FIGS. 1 and 3, there is relative angular displacement between parts A and B of the damper-type flywheel and everything proceeds as if, as shown by the arrow F2 in FIGS. 3A and 3B, part B were moving angularly relative to part A in the circumferential direction opposite that shown by the aforementioned arrow F1.

During a first phase which corresponds to relatively low values of the corresponding angular relative movement, only the spring centering members 47 yield elastically, their stiffness being relatively low, and in any event very much lower than the relatively high stiffness of the circumferentially acting spring members 35.

During this first phase there is only slipping of parts A and B relative to each other at the level of the friction ring 30, as if the circumferentially acting spring members 35 were rigid.

This first phase continues until (FIG. 3A) the finger 44T on the arms 42 of the flange assembly 23 of part B comes into contact with the bottom of the dished surface 40 of the corresponding plug member 38 of the circumferentially acting spring member 35 immediately downstream of the arm 42 in the circumferential direction concerned.

As relative axial movement between parts A and B continues, the circumferentially acting spring members 35 come into operation, in addition to the friction ring 30, being compressed in the circumferential direction, the spring centering members 47 remaining compressed.

This second phase continues until part B is positively driven by part A as a result of the elastic material buffers 41 coming into contact with each other and possibly being compressed.

During this second phase the fingers 50R of the circumferential spacers 46 move circumferentially away from the dished surfaces 40 of the corresponding plug members 38 of the circumferentially acting spring members 35 immediately upstream in the circumferential direction concerned, but despite the centrifugal forces to which these circumferential spacers are subjected at this time, they remain properly in place by virtue of the fact that they are retained by the bars 53 provided for this purpose on one of the flanges 24 forming the flange assembly of part B.

The preceeding two phases of operation correspond to an increasing change in the torque transmitted by the damper-type flywheel due to a corresponding action on the accelerator of the vehicle concerned.

If this action is terminated, the torque transmitted by the damper-type flywheel decreases and a process which is the inverse of that just described takes place, during so-called "downshift" functioning.

Bearing on the circumferential spacers 46 and through these on the circumferentially acting spring members 35 assumed to have returned to their initial inoperative configuration, the spring centering members 47 procure, for the neutral position of the associated gearbox, the return to its initial inoperative position of the flange assembly 23 of part B and, through the flange assembly 23, of part B and the members keyed to it in the angular direction.

Apart from the centering of the flange assembly 23 of the part B achieved in this way, the spring centering members 47, which are also circumferentially acting, advantageously constitute a stage of low stiffness operative before the high-stiffness stage consisting of the circumferentially acting spring members 35.

Figure 4:
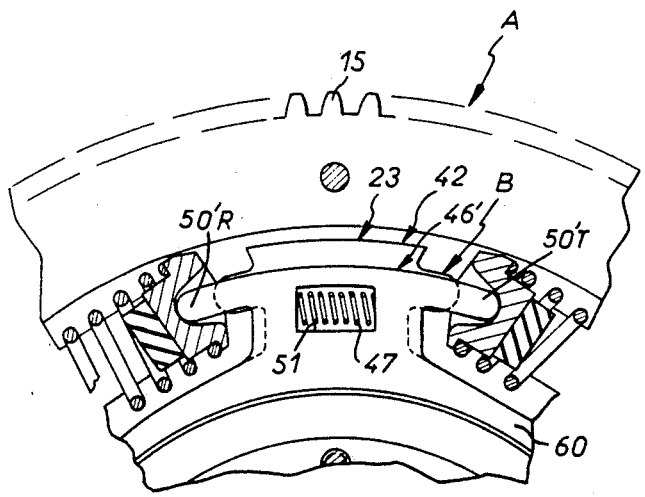
FIGS. 4 and 5 are partial views respectively analogous to those of FIGS. 1 and 2 and relating to a first alternative embodiment.
Figure 5:
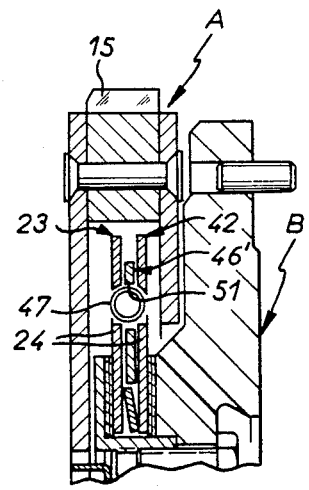

In the embodiment shown in FIGS. 4 and 5 the plates constituting the circumferential spacers 46 are circumferentially linked to each other by a support ring 60 which is common to all of the circumferential spacers 46 and which retains them in the radial direction.

The support ring 60 extends along the smaller diameter circumferential edge of the circumferential spacers 46', but it is to be understood that as an alternative to this it could equally well extend along their larger diameter circumferential edge.

Figure 6:
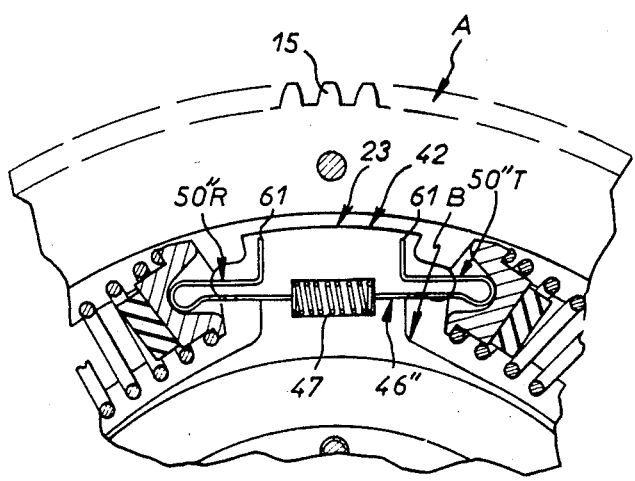
FIGS. 6 and 7 are also partial views respectively analogous to those of FIGS. 1 and 2 and relating to a second alternative embodiment.
Figure 7:
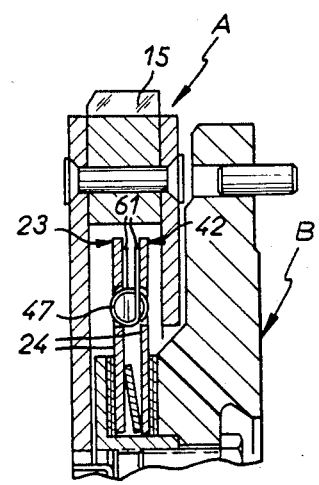

In the embodiment shown in FIGS. 6 and 7 the circumferential spacers 46" are each reduced to the fingers 50R", 50T".

The fingers 50R", 50T" each extend from the two circumferential ends of the corresponding spring centering member 47 and are in one piece with the spring centering member 47, each being formed by an appropriately shaped extension of the wire from which the latter is made.

The fingers 50T", 50R" to which each of the circumferential spacers 46" is thus reduced each have a U-shaped configuration, having at their free end a right-angle return 61 pointing radially away from the axis of the flywheel.

Such right-angle returns 61 facilitate handling of the assembly consisting of a spring centering member 47 and the fingers 50T", 50R" which extend it, and thus facilitate the fitting of this assembly.

They also contribute to securing it between the flanges 24 forming the flange assembly 23 of part B.

In the previous description the torque limiter 26 has been deliberately ignored.

If during operation the torque transmitted by the damper-type flywheel exceeds a predetermined value there occurs at the torque limiter 26 relative slip between the two coaxial parts A and B constituting it.

The same occurs in the case of resonance between the latter.

It is to be understood that the present invention is not limited to the embodiments described and shown, but encompasses any variant as to the execution and/or combination of the various component parts thereof.

Specifically, the arms of the flange assembly of the second part intended to interfere with the circumferentially acting spring members operative between it and the first part may be circumferentially linked together in one piece by a part of said flange assembly extending radially beyond said circumferentially acting spring members, said part of this flange assembly then defining with said arms and its main part openings adapted to accommodate these circumferentially acting spring members.

Also, the spring centering members 47 may be placed on a circumference having a different diameter to the circumference on which the circumferentially acting spring members 35 are located.

For example, in the case of the embodiment shown in FIGS. 4 and 5 the spring centering members 47 could be disposed in openings formed in the support rings 60, openings also being provided in corresponding relationship with them in the flanges 24 constituting the flange assembly 23.

The same applies if, rather than extending along the smaller diameter circumferential edge of the circumferential spacers 46', the support ring 60 extended along their larger diameter circumferential edge, the flanges 24 constituting the flange assembly 23 then comprising, as previously mentioned, and for the purpose of forming the necessary openings for the spring centering members 47, a part extending radially beyond the circumferentially acting spring members 35.

In both cases the spring centering members 47 may be offset circumferentially relative to the arms 42 of the flange assembly 23.

When the number of spring centering members used is an even number, these members may be disposed in opposed relationships as described in French Pat. No 2.268.994 of Apr. 24, 1974.

Finally, it is not mandatory for a plurality of spring centering members 47 to be used.

To the contrary, a single such spring centering member 47, and thus a single circumferential spacer 46, 46' or 46" may be sufficient.

We claim:

1. Damper-type multi-part flywheel comprising a first flywheel part, two spaced annular flanges on said first flywheel part, a second flywheel part coaxial with said first flywheel part, said first and second flywheel parts being rotatable relative to each other, at least one annular flange on said second flywheel part disposed between said annular flanges on said first flywheel part, friction means operative between said first and second flywheel parts for relatively small amounts of relative displacement between them, at least two circumferentially acting spring members operative between said first and second flywheel parts in conjunction with said friction means for relatively large amounts of relative displacement between them, openings in said annular flanges of said first flywheel part accommodating said spring members, arms on said at least one flange of said second flywheel part cooperating with said spring members, resilient centering means between said first and second flywheel parts so as to provide clearance in each circumferential direction between said spring members and said arms in an inoperative configuration of the flywheel, and at least one circumferential spacer disposed circumferentially between two of said spring members and bearing circumferentially on said two spring members, said resilient centering means being operatively disposed between said at least one flange and said spacer.

2. Flywheel according to claim 1, wherein said resilient centering means are operatively disposed between at least one of said arms and at least one circumferential spacer.

3. Flywheel according to claim 1, further comprising plug members disposed circumferentially between each spring member and the radial edges of said openings accommodating said spring members, a concave dished surface on each plug member facing towards the corresponding radial edge of the respective opening, and two fingers on said at least one circumferential spacer extending in respective opposite circumferential directions, wherein, in said inoperative configuration of the flywheel, each finger bears on the bottom of the dished surface of the respective plug member of the pair of plug members between which said spacer is situated.

4. Flywheel according to claim 1, wherein said second flywheel part comprises two axially spaced annular flanges, each of said circumferential spacers extending axially between them.

5. Flywheel according to claim 1, wherein said at least one flange of said second flywheel part comprises an axially projecting bar adapted to secure each of said circumferential spacers in the radial direction.

6. Flywheel according to claim 1, wherein said resilient centering means comprises at least one resilient centering member and said at least one flange of said second flywheel part comprises at least one opening accommodating said at least one resilient centering member.

7. Flywheel according to claim 6, comprising a plurality of resilient centering members and an equal number of circumferential spacers.

8. Flywheel according to claim 7, wherein each circumferential spacer is a plate with an opening accommodating the respective resilient centering member, and said plates are independent of one another.

9. Flywheel according to claim 7, wherein each circumferential spacer is a plate with an opening accommodating the respective resilient centering member, further comprising a support ring for said plates whereby said plates are fastened together in the circumferential direction.

10. Flywheel according to claim 6, wherein each circumferential spacer is a plate with an opening accommodating the respective resilient centering member.

11. Flywheel according to claim 10, wherein in said inoperative configuration of the flywheel a resilient centering member is accommodated without circumferential clearance in said opening in said plate.

12. Flywheel according to claim 6, wherein each circumferential spacer consists of two fingers respectively extending from the circumferential ends of the corresponding resilient centering member.

13. Flywheel according to claim 12, wherein said resilient centering member is a helical coil spring and said two fingers are in one piece with said spring, each being formed by appropriately shaping the respective end of said spring.

14. Flywheel according to claim 6, wherein in said inoperative configuration of the flywheel a resilient centering member is accommodated without circumferential clearance in the respective opening in said at least one flange of said second flywheel part.

* * * * *